United States Patent
Strange

(10) Patent No.: US 11,548,272 B2
(45) Date of Patent: *Jan. 10, 2023

(54) METHOD FOR APPLYING A POLYMERIC FILM TO A SUBSTRATE AND RESULTING ARTICLES

(71) Applicant: entrotech, inc., Columbus, OH (US)

(72) Inventor: Andrew C. Strange, Worthington, OH (US)

(73) Assignee: entrotech, inc., Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/412,256

(22) Filed: Aug. 26, 2021

(65) Prior Publication Data

US 2021/0387447 A1 Dec. 16, 2021

Related U.S. Application Data

(63) Continuation of application No. 16/756,396, filed as application No. PCT/US2018/057888 on Oct. 27, 2018, now Pat. No. 11,123,972.

(60) Provisional application No. 62/577,960, filed on Oct. 27, 2017.

(51) Int. Cl.
| | |
|---|---|
| B32B 37/00 | (2006.01) |
| B32B 37/04 | (2006.01) |
| B32B 38/10 | (2006.01) |
| B32B 38/18 | (2006.01) |
| B32B 27/30 | (2006.01) |
| B32B 27/08 | (2006.01) |
| B32B 27/20 | (2006.01) |
| B32B 27/22 | (2006.01) |
| B32B 27/36 | (2006.01) |
| B32B 27/18 | (2006.01) |
| B32B 27/32 | (2006.01) |
| B44C 1/10 | (2006.01) |
| B32B 27/40 | (2006.01) |
| B32B 37/15 | (2006.01) |
| B29C 63/02 | (2006.01) |
| B32B 7/12 | (2006.01) |
| B32B 27/12 | (2006.01) |
| B32B 27/14 | (2006.01) |
| C08J 5/12 | (2006.01) |
| C08J 5/18 | (2006.01) |

(52) U.S. Cl.
CPC ............ *B32B 37/025* (2013.01); *B32B 37/04* (2013.01); *B32B 38/10* (2013.01); *B32B 38/18* (2013.01); *B32B 2375/00* (2013.01); *B32B 2605/00* (2013.01)

(58) Field of Classification Search
None
See application file for complete search history.

(56) References Cited

U.S. PATENT DOCUMENTS

| | | | |
|---|---|---|---|
| 4,119,479 | A | 10/1978 | Williams, Jr. et al. |
| 4,932,857 | A | 6/1990 | Nishino et al. |
| 5,183,597 | A | 2/1993 | Lu |
| 5,405,675 | A | 4/1995 | Sawka et al. |
| 5,637,171 | A | 6/1997 | Kasahara |
| 5,951,801 | A | 9/1999 | Weissenfluh et al. |
| 9,364,857 | B1 | 6/2016 | Uhl et al. |
| 11,123,972 | B2 * | 9/2021 | Strange .................. B32B 27/38 |
| 2007/0039693 | A1 | 2/2007 | Forget et al. |
| 2007/0116903 | A1 | 5/2007 | Song et al. |
| 2008/0280145 | A1 | 11/2008 | Paschkowski et al. |
| 2009/0111938 | A1 | 4/2009 | Hazan |
| 2010/0059167 | A1 | 3/2010 | McGuire, Jr. et al. |
| 2011/0137006 | A1 | 6/2011 | McGuire, Jr. et al. |
| 2011/0241261 | A1 | 10/2011 | McGuire, Jr. et al. |
| 2015/0183198 | A1 | 7/2015 | McGuire, Jr. |
| 2017/0158924 | A1 | 6/2017 | Hoshi et al. |
| 2017/0210109 | A1 | 7/2017 | Naeyaert |
| 2019/0322827 | A1 | 10/2019 | Barber et al. |
| 2020/0247036 | A1 | 8/2020 | Strange |

FOREIGN PATENT DOCUMENTS

| | | |
|---|---|---|
| JP | 64-071714 A | 3/1989 |
| JP | 05-212350 A | 8/1993 |
| JP | 05-301242 A | 11/1993 |
| JP | 2000-25166 A | 1/2000 |
| JP | 2002-36437 A | 2/2002 |
| JP | 2006-35540 A | 2/2006 |
| WO | WO-2007/048141 | 4/2007 |

(Continued)

OTHER PUBLICATIONS

"Characterization of LDPE Over a Large Frequency Range," PerkinElmer, Inc. (2011).

(Continued)

*Primary Examiner* — Ramsey Zacharia
(74) *Attorney, Agent, or Firm* — The Griffith Law Firm, A P.C.; Lisa Griffith

(57) ABSTRACT

A polymeric film assembly comprising a first solidified interlayer on a polymeric film or laminate comprising the same that is contacted with at least a portion of a surface of an underlying article to provide, for example, desired surface characteristics. At least a portion of the first solidified interlayer becomes a softened interlayer positioned between the polymeric film and the surface of the article when contacted as such. The softened interlayer is then converted to a second solidified interlayer, which second solidified interlayer may be in a different form than or same form as the first solidified interlayer initially provided, for adherence of the polymeric film to at least the portion of the surface of the article. Ease of removal and/or repair of polymeric film and laminates comprising the polymeric film that are so applied is facilitated.

18 Claims, No Drawings

(56) References Cited

FOREIGN PATENT DOCUMENTS

| WO | WO-2010/036981 | 4/2010 |
| WO | WO-2015/102623 | 7/2015 |
| WO | WO-2016/061295 | 4/2016 |
| WO | WO-2016/126571 | 8/2016 |
| WO | WO-2016/148867 | 9/2016 |
| WO | WO-2017/156506 | 9/2017 |
| WO | WO-2017/156507 | 9/2017 |
| WO | WO-2019/084522 | 5/2019 |

OTHER PUBLICATIONS

"LOCTITE EA 9895 WPP AERO Composite Surfacing Media (Known AS Hysol EA 9895 Wet Peel Ply)," Loctite Technical Process Bulletin (Rev. Sep. 2013).

* cited by examiner

METHOD FOR APPLYING A POLYMERIC FILM TO A SUBSTRATE AND RESULTING ARTICLES

CROSS-REFERENCE TO RELATED APPLICATIONS

This application is a continuation of U.S. patent application Ser. No. 16/756,396, which is a U.S. national stage application of PCT Patent Application No. PCT/US18/57888 filed on Oct. 27, 2018, which claims priority from U.S. Provisional Patent Application No. 62/577,960 filed on Oct. 27, 2017, all of which are incorporated by reference herein in their entirety.

BACKGROUND OF THE INVENTION

The present invention is directed toward a method for applying a polymeric film to a substrate and resulting articles.

Polymeric materials (also referred to herein simply as "polymers") are used in many applications, often in the form of a film. A "film" is generally understood to be a relatively thin, continuous, single layer of material. In contrast, many conventionally applied "coatings" do not form a continuous or uniform layer of material on an underlying substrate. As such, unlike polymeric films, coatings are often not able to be physically separated from the supporting substrate on which they are formed so that they can be used as a stand-alone layer or as one of multiple layers in another application. Thus, coating technology has its limitations and is generally differentiated from that associated with polymeric films.

Polymeric films are often capable of imparting desired properties in their intended application without the need for coating multiple layers or laminating multiple films together and are widely used in many applications. Whether a polymeric film is suitable for an intended application depends upon, for example, its physical properties such as strength, elasticity, clarity, color, durability, and the like. Even when properties of a polymeric film are optimized, however, those benefits are often not fully realized due to conventional methodology for applying such films to an underlying surface, which methodology often results in entrapment of air—visible as a defect—between the polymeric film and underlying surface. This problem, and one solution therefor, is described in U.S. Patent Publication No. US-2015-0183198-A1.

As described in U.S. Patent Publication No. US-2015-0183198-A1, painted surfaces are commonly used in many different types of applications. Painted surfaces may not only improve aesthetic properties, but they may also or alternatively improve functional properties of underlying surfaces and help protect the same. One such application is in the transportation industry, where exterior painted surfaces are typically exposed to a variety of environments, some of which can be very harsh on the surface. Examples of articles in the transportation industry having such painted surfaces include vehicles providing transportation over land, in the water, and in the air. Such vehicles include aircraft and land-based motorized vehicles like automobiles and trucks. The paint on such surfaces can function to protect the underlying surface from damage due to that exposure. However, the paint itself must also be durable to withstand repeated exposure to such damaging environments.

Recently, paint in film form has been developed for application to such surfaces as an alternative to traditional paint, which traditional paint is typically liquid-based and applied to surfaces in its liquid form. Paint in film form is based on at least one polymeric film and is also referred to herein as a "polymeric film" or "polymeric paint film." An example of such polymeric paint film is described in U.S. Patent Publication No. US-2010-0059167-A1, entitled "Paint Replacement Films, Composites Therefrom, and Related Methods."

Yet, as with application of other polymeric films to surfaces, particularly those surfaces having complex topographies, adequate adhesion at an interface and effective removal of entrapped air between the polymeric film and the underlying surface has proven to be a challenge. For example, in many cases, when adhesive adhering a polymeric film attaches to an underlying surface, which adherence does not necessarily progress along a uniform front, particularly as topography of the underlying surface increases in complexity (i.e., such that it contains significant convex and concave portions), air often becomes entrapped at the interface between the polymeric film and the underlying surface. Due to the adhesive's presence at the advancing front, beyond which is entrapped air, air becomes increasingly difficult to completely remove as adherence of the polymeric film progresses. As such, mechanisms for facilitating air bleed from such interfaces have been explored.

Many conventional air bleed mechanisms rely on use of structured adhesive layers to remove entrapped air. For example, see U.S. Patent Publication No. 2011/0111157 and U.S. Pat. No. 7,332,205. Another polymeric film-based structure known to facilitate air bleed between the structure and an underlying surface after application includes a microstructured surface, such as that described in U.S. Pat. No. 5,897,930. While effective in many applications, such microstructures have been found to obscure optical clarity in certain applications. For example, structure from the adhesive layer is often still visible (including to the naked human eye) after application of the polymeric film to an underlying surface. Visibility is even more pronounced as thickness of the polymeric film decreases and/or transparency of the polymeric film increases. As is readily understood, this presents a less than ideal solution to the problem of removal of entrapped air. In addition, types of polymeric films able to be effectively applied to an article's surface are limited by the constraints associated with presence of such a microstructured surface.

Optical clarity of polymeric materials is an important consideration when selecting materials for use in optical and other applications where specific surface aesthetics, relating to outward appearance of a polymeric film applied to an article, can be desirable. Surface aesthetics may alternatively or also relate to preservation or enhancement of properties of an underlying surface of the article to which a polymeric film is applied. When the surface underlying an applied polymeric film comprises a composite material, the presence of entrapped air and other defects inherent within the underlying surface is more prevalent, yet the underlying surface is often more susceptible to damage when attempting to preserve or enhance aesthetics of the same.

In the case of composite materials (e.g., a fiber-reinforced composites), obtaining desired surface aesthetics without affecting physical properties of the composite material surface often presents challenges, which are increasing in importance given that composite materials are finding increased use in applications where lightweight materials are desired and where an associated compromise in strength or stiffness of the material would likely be problematic. Many composite materials are also useful in applications where corrosion resistance is desired, as composite materials more often exhibit excellent corrosion resistance as compared to alternative materials.

A wide variety of composite materials are known. In the case of a fiber-reinforced composite, a polymeric resin matrix and fibrous reinforcement together often form the composite. A variety of materials can be used for each of the polymeric resin matrix and the fibrous reinforcement components. For example, materials useful for fibrous reinforcement include carbon fibers, boron fibers, and glass fibers. Further, examples of materials useful for the polymeric resin matrix include thermoplastics (e.g., nylon) and thermosets (e.g., epoxies and phenolics).

Due to their beneficial properties, a variety of specialized sporting implements and other articles are increasingly being made from composite materials. For example, composite materials are increasingly being used in shaft-based sporting implements (i.e., those sporting implements having a generally elongated portion, which may or may not be hollow or uniform in thickness and shape throughout) and similar articles. Such articles include, for example, golf clubs, bicycle frames, hockey sticks, lacrosse sticks, skis, ski poles, fishing rods, tennis rackets, arrows, polo mallets, and bats. As an example, the use of composite materials enables golf club manufacturers to produce shafts having varying degrees of strength, flexibility, and torsional stiffness.

In addition, a variety of articles in the transportation and energy industries are increasingly being made from composite materials. For example, composite materials are often used to make various aerospace components, such as wing and blade components, including those on helicopters and specialized military aircraft. Further, composite materials are often used to make various automotive components, both interior and exterior, including body panels, roofs, doors, gear shift knobs, seat frames, steering wheels, and others. In the energy industry, composite materials are used to make wind mill blades—e.g., large wind turbine blades are made more efficient through the use of carbon fiber-reinforced composites. Indeed, the number of current and potential applications for composite materials is extensive.

Beneficially, composite materials offer enhancements in strength, stiffness, corrosion resistance, and weight savings. These beneficial properties are often balanced against competing relative weaknesses in abrasion resistance and impact resistance. In addition, as many composite articles are made by layering multiple, individual composite material layers to achieve the desired properties, such composite articles are susceptible to interlayer delamination, particularly upon impact. This is especially the case with carbon fiber-reinforced composites (also referred to as "CFR composites"). When interlayer delamination occurs, structural integrity of such articles is compromised, sometimes leaving the composite article useless as intended. Further, in extreme cases where the composite article fractures, a sharp broken surface can result (i.e., with reinforcing fibers extending haphazardly therefrom), which impacts not only the usefulness of the article, but also the safety of those using such articles and those around them. Thus, breakage prevention and containment are also important design factors.

In order to enhance certain properties of composite articles, gel coats or similar protective coatings have conventionally been used. Gel coats often impart a glossy appearance and improve other aesthetic properties of the article. In addition, gel coats can provide some, although limited, enhancements in abrasion resistance. Gel coats or similar protective coatings are conventionally applied to composite articles that are formed by molding for, if no other reason, aesthetic enhancement. Particularly when molding articles from composite materials, however, surface imperfections are likely to develop, giving rise to a need for aesthetic enhancement. One mechanism for the increased number of surface imperfections in molded composite articles is associated with tiny air bubbles forming at the interface with the mold when the polymer matrix of such composites does not sufficiently flow throughout the reinforcement (e.g., fibers) during molding. The result is that the surface of the composite article, which is formed against the face of the mold, contains imperfections such as voids that can detract from a glass-like or otherwise desired appearance. Imperfections can complicate the process of finishing the surface of the composite article.

There are two widely used methods of applying gel coats or similar exterior protective coatings to composite articles. The first method involves spraying the gel coat onto an exterior surface of a composite article after the article is formed (e.g., by molding). Imperfections can complicate the process of finishing the surface of a composite article according to this method. For example, air can become entrapped within voids on the surface when a coating is spray-applied on the surface. At such locations of entrapped air, a coating has no substrate to adhere to. Hence, the coating will typically either flow into the void or de-wet that area on the surface. In addition to complications associated with entrapped air, conventional coatings flowing over a surface in general tend to result in a replicated underlying surface texture on the outwardly exposed surface of the hardened coating after it conforms to undulations and imperfections in the underlying surface.

The second method involves eliminating this subsequent processing (e.g., post-molding) step by pre-applying the gel coat to the interior surface of, for example, a mold where it can then be transferred to an exterior surface of the composite article formed therein. For example, see U.S. Pat. Nos. 4,081,578; 4,748,192; and 5,849,168. This method, which is one variation of "in-mold processing," is sometimes referred to as in-mold decoration or in-mold labeling depending on the application and materials used. Another variation in the use of in-mold processing for application of materials, although complicated and inefficient, is described in U.S. Pat. No. 5,768,285.

When a polymeric film, as compared to a coating, is applied to a surface, complications still exist. For example, the process for conventional application of a pressure-sensitive adhesive (PSA)—backed polymeric film can also be complicated by voids. Similar to complications associated with application of a conventional coating, at locations of entrapped air on a surface, a polymeric film and any adhesive backing thereon have no substrate to adhere to. As such, and given that the polymeric film is not a liquid coating, a polymeric film cannot flow into the void or dewet the surface. As a result, the polymeric film generally will span the void with air trapped underneath. If pressure is applied to such areas, and if the polymeric film has sufficient stretchability, the polymeric film will generally stretch into the space of the void, which creates visual imperfections on the surface. If entrapped air is not removed, during use of the resulting article, the entrapped air will often expand or contract, which process creates protrusions or depressions within the polymeric film's surface. In addition to complications associated with entrapped air, conventional polymeric films often have a fixed thickness, which factor translates into replication of an underlying surface texture on the outwardly exposed surface of the film as it conforms to undulations and imperfections in the underlying surface.

All things considered, alternative methodology for application of polymeric films to surfaces of articles is desired. Such a need is particularly illustrated in conjunction with use of conventional spray-applied clear coats, which methodology generally requires application of several coating layers, often with sanding in between each coat, in order to obtain a smooth surface with desired gloss characteristics. Particularly when the underlying surface is a fiber-based composite material, this process is not only time consuming, but can also damage the fiber-based surface during sanding.

SUMMARY OF THE INVENTION

According to the invention, a polymeric film or laminate comprising the same is applied to at least a portion of a surface of an underlying article to provide, for example, desired surface characteristics. To assist in such application, a first solidified interlayer is applied onto the surface of the polymeric film or laminate comprising the polymeric film to form a polymeric film assembly to be contacted with the portion of the surface of the article. The polymeric assembly is applied to at least a portion of the surface of the article by contacting the first solidified interlayer to the surface of the article such that at least a portion of the first solidified interlayer becomes a softened interlayer positioned between the polymeric film and the surface of the article. The softened interlayer is then converted to a second solidified interlayer, which second solidified interlayer may be in a different form than or same form as the first solidified interlayer initially provided, for adherence of the polymeric film to at least the portion of the surface of the article.

Ease of removal and/or repair of polymeric film and laminates comprising the polymeric film that are so applied is facilitated as the polymeric film and layers adjacent the second solidified interlayer can be efficiently and effectively separated from the underlying article, leaving behind a substantial portion of the second solidified interlayer on the underlying article. Without the need to utilize additional solidified interlayer material in associated methodology, another polymeric film or a laminate comprising the same can be efficiently and effectively applied to that surface of the article according to conventional methodology.

DETAILED DESCRIPTION OF THE INVENTION

According to the invention, a polymeric film assembly comprising a polymeric film is applied to at least a portion of a surface of an underlying article. In that regard, a polymeric film having desired surface characteristics (e.g., smoothness, gloss, etc.) is applied to an underlying surface of the article.

In order to assist in application of such a polymeric film to an underlying surface, particularly a fiber-based composite material surface (i.e., fiber-based surface) of an article, a room temperature-solidified interlayer (also referred to herein as a "solidified interlayer") is present on the surface of the polymeric film assembly to be contacted with the surface of the article to which the polymeric film is applied. When the polymeric film assembly is applied to a heated surface of an article, only the heated portion of the solidified interlayer softens to the form of a "softened interlayer." Upon application of a polymeric film assembly to an underlying surface as such, the softened interlayer exhibits a viscosity so that it can flow over and into voids and defects that are commonplace within fiber-based surfaces, which flow translates into a smoother surface on the resulting article and such a surface with fewer visible defects. Advantageously, according to this exemplary embodiment, flow of the softened interlayer from the interface of the polymeric film assembly and underlying substrate with which it is contacted is minimized as only the portion of solidified interlayer in contact with the heated surface becomes softened.

After contact of the softened interlayer with the underlying surface, the softened interlayer than returns to a solidified interlayer, optionally with polymerization of the same. As used herein, the term "polymerization" and the like encompasses what is sometimes referred to by those of ordinary skill in the art as "cure," "curing," and the like. Those terms may be used interchangeably herein and by those of ordinary skill in the art. For example, use of the term curing is often associated with polymerization (aka "cure") of epoxy resins.

According to one embodiment, after application to the surface, the softened interlayer reverts to essentially the same—in terms of chemistry and material properties—solidified interlayer upon cooling. According to another embodiment, after application to the surface, a softened interlayer of polymerizable composition partially polymerizes and also further solidifies by cooling. Upon cooling, the previously softened interlayer can exhibit properties associated with a viscoelastic fluid, a viscoelastic solid, or an elastic solid. In an exemplary embodiment, after application of the polymeric film to the underlying surface and cooling to room temperature, the solidified interlayer exhibits a room temperature Brookfield viscosity of greater than about 20,000 centiPoise.

Using methodology of the present invention, polymeric films of the invention impart desired surface characteristics as an improvement over conventional techniques using a surface coating that is spray-applied or otherwise. Resulting articles having improved surface characteristics are, thus, obtainable using methodology of the invention. In preferred embodiments, resulting articles have at least comparable, and often superior, surface characteristics as compared to those including traditionally spray-applied clear coatings and those polymeric films adhered to an underlying surface using conventional methodology.

Another advantage of the present invention relates to ease of removal and/or repair of polymeric film applied to underlying surfaces according to improved methodology. For example, in one embodiment, the solidified interlayer adheres better to the underlying surface than to the polymeric film and/or layers (e.g., optional adhesive layer) adjacent thereto when the polymeric film is part of a laminate comprising the same. Lack of covalent crosslinking between the solidified interlayer and polymeric film and/or layers adjacent thereto contributes to this differential adherence. Without such covalent crosslinking, the polymeric film and layers adjacent thereto can be efficiently and effectively separated from the underlying article, leaving behind a substantial portion of the solidified interlayer on the underlying article.

Without the need to utilize additional interlayer material in associated methodology, polymeric film or laminates comprising the same can be efficiently and effectively reapplied to that surface of the article according to conventional methodology. Surface voids and defects that were present on the underlying surface of the article, such as is often the case with fiber-based surfaces, before application of the removed polymeric film according to methodology of the invention remain substantially obviated by the solidified interlayer remaining on the surface as a result of its application during the original polymeric film application.

Polymeric Film and Laminates Comprising the Polymeric Film

"Polymeric films" of the invention are relatively thin, continuous, single layers of polymeric material. Polymeric films of the invention are not generally considered by those of ordinary skill in the polymer arts to be adhesives.

In further embodiments, more than one polymeric film or other layers of material may be provided in the form of a "laminate" for application to an article's surface. Although thickness may be much greater, according to one aspect of a polymeric film laminate, the laminate has an overall thickness of less than about 400 microns. In a further embodiment, the laminate has an overall thickness of less than about 200 microns. In a further embodiment still, the laminate has an overall thickness of less than about 50 microns. In yet a further embodiment, the laminate has an overall thickness of about 10 microns. Generally, thicker laminates provide greater abrasion resistance, while thinner laminates may be used when corrosion or similar resistance is of primary concern.

The nature of polymeric film laminates useful in the present invention may vary, depending for example on whether the laminate is being first-applied to a surface of an article with a solidified interlayer therein contacting that surface or whether the laminate is being applied to that same surface after removal of a polymeric film applied using the solidified interlayer from that same surface. For example, in one embodiment, a polymeric film laminate that is applied to the surface of the article from which a polymeric film assembly comprising a solidified interlayer was applied previously includes an adhesive (e.g., pressure-sensitive adhesive) layer. In an exemplary aspect of this embodiment, such a polymeric film laminate comprises an adhesive layer, as opposed to a solidified interlayer, on the surface of the polymeric film to be contacted with the underlying surface on which it is to be applied.

A wide variety of polymeric films are known, sometimes being referred to as "protective sheets," and which have been applied to a variety of underlying surfaces, including those based on composite materials. See, for example, U.S. Pat. No. 8,545,959, the contents of which are incorporated herein by reference. However, as discussed in the background above, methods for their application can be complicated, particularly given problems associated with removal of entrapped air between the polymeric film and underlying surface. Entrapped air is one factor contributing to often visible defects in the resulting surface.

The polymeric film may, optionally, be at least partially pigmented (i.e., colored) and/or at least partially metallized as a "polymeric paint film." In an exemplary embodiment, a polymeric film of the invention is at least partially pigmented. Depending upon, among other considerations, the type of pigment and thickness of the polymeric film, pigmented polymeric films of the invention may be substantially translucent or substantially opaque.

In another exemplary embodiment, a polymeric film of the invention is metallized. Generally, metallized polymeric films of the invention are substantially opaque, but metallized polymeric films may be at least partially transparent depending on the degree of metallization.

In a further exemplary embodiment, a polymeric film of the invention is both pigmented and metallized. However, the polymeric film need not contain additives altering the appearance of an underlying article to be considered a polymeric film applicable according to methods of the invention.

In another exemplary embodiment, the polymeric film is essentially free of pigment and metallization. According to one aspect of this embodiment, the polymeric film is substantially transparent. According to another aspect of this embodiment, the polymeric film is substantially translucent. According to another aspect of this embodiment, the polymeric film is substantially opaque.

In order to facilitate adherence of the polymeric film to surfaces having relatively complex topographies, preferably, the polymeric film is stretchable. The term "stretchable" refers to a material's ductility and its ability to be stretched (i.e., elongated). Exemplary stretchable polymeric films are capable of being stretched to a length that is at least about 105% of its initial length or more without breaking. For example, a stretchable polymeric film having a length of 100 centimeters is capable of being stretched to a length of 105 centimeters or more without breaking. In one embodiment, stretchable polymeric films are capable of being stretched to a length that is at least about 125% of its initial length or more without breaking. For example, a stretchable polymeric film having a length of 100 centimeters is capable of being stretched to a length of 125 centimeters or more without breaking. In another embodiment, stretchable polymeric films are capable of being stretched to a length that is at least about 150% of its initial length or more without breaking. For example, a stretchable polymeric film having a length of 100 centimeters is capable of being stretched to a length of 150 centimeters or more without breaking.

In one embodiment, the polymeric film does not fully recover once stretched. An exemplary polymeric film having such reduced recovery is capable of being stretched to a length that is at least about 110% of its initial length without breaking, but the polymeric film does not recover to its original state after such stretching. According to one aspect of this embodiment, the polymeric film recovers to no less than about 105%, or preferably to no less than about 110% of its initial length, after stretching to a length that is at least about 110% of its initial length.

In another embodiment, the polymeric film is not only stretchable, but also extensible. The terms "extensible" and "extensibility" refer to a material's ductility and its ability to be stretched and recover to essentially its original state after stretching. Extensible polymeric films are capable of recovering to their original state when stretched up to about 125% of their initial length or more. That is, extensible polymeric films are capable of recovering to their original state when stretched to a length that is about 125% or more of its initial length. For example, a polymeric film having an initial length of about 100 centimeters is capable of recovering to a length of about 100 centimeters after being stretched to a length of 125 centimeters or more when it is extensible. Preferably, extensible polymeric films are capable of recovering to their original state when stretched up to about 150% of their initial length or more.

In another preferred embodiment, the polymeric film exhibits essentially no plastic deformation when stretched up to about 125% of its initial length—e.g., when a polymeric film is stretched from an initial length of 100 centimeters up to a length of about 125 centimeters. In a further preferred embodiment, the polymeric film exhibits essentially no plastic deformation when stretched up to about 150% of its initial length—e.g., when a polymeric film is stretched from an initial length of 100 centimeters up to a length of about 150 centimeters. Preferably, a force of less than about 40 Newtons is required to elongate the polymeric film to 150% its initial length.

According to a preferred embodiment of the invention, polymeric films are capable of elongating more than 200% before breaking. In still another preferred embodiment, the polymeric film exhibits greater than about 210% elongation at break when tested according to ASTM D638-95. In a further preferred embodiment, the polymeric film exhibits greater than about 260% elongation at break when tested according to ASTM D638-95. In a still further preferred embodiment, the polymeric film exhibits greater than about 300% elongation at break when tested according to ASTM D638-95. In yet another preferred embodiment, the polymeric film exhibits greater than about 350% elongation at break when tested according to ASTM D638-95.

Useful polymeric films comprise any suitable chemistry. While more than one polymeric material can be used in polymeric films and other layers within laminates of the invention, the following description is generally made with reference to one such type of polymeric material within that layer for simplicity only.

The polymeric film comprises any suitable polymeric material. For example, the polymeric film may be polyurethane-based, polyacrylate-based, polyepoxide-based, or polyester elastomer-based. Although generally not preferred for certain embodiments due to its relatively low extensibility, the polymeric film can also be polyvinyl-based, such as polyvinyl chloride (PVC), polyvinyl acetate (PVA), polyvinylidene fluoride (PVDF), or general polyvinyl fluoride (PVF) (e.g., that available from DuPont under the TEDLAR trade designation), or α-olefin-based in embodiments where full recovery of the polymeric film after stretching is not necessary or desired.

The polymeric film is preferably polyurethane-based in that it comprises any suitable polyurethane material. For simplicity, the term "polyurethane" is sometimes used herein to reference polymeric material containing urethane (also known as carbamate) linkages in combination with urea linkages (i.e., in the case of poly(urethane-urea)s). Thus, polyurethanes of the invention contain at least urethane linkages and, optionally, urea linkages. Many commercially available polyurethanes are available and suitable for use as polyurethane-based polymeric films according to the invention. For example, suitable polyurethanes are available from entrotech, inc. (Columbus, Ohio) under the HT1331, HT2312, HT2313 trade designations.

In addition to additives altering the appearance of an article, which additives are present in exemplary embodiments, any suitable additives can optionally be included in the polymeric film. For example, stabilizers (e.g., antioxidants, heat stabilizers, and UV-stabilizers), crosslinkers (e.g., aluminum or melamine crosslinkers), binders, corrosion inhibitors, plasticizers, photocrosslinkers, fillers, and other conventional additives as known to those of ordinary skill in the art can be incorporated into the polymeric film. If desired, an adhesion promoter may be included in the polymeric film. However, in preferred embodiments, the material comprising the polymeric film is selected to be chemically compatible with any adjacent layers within laminates of which the polymeric film is a part. Thus, an adhesion promoter is not required according to preferred embodiments of the invention.

The polymeric film may be pigmented and/or metallized and substantially transparent, substantially translucent, or substantially opaque, depending on the application. When the polymeric film is substantially transparent or substantially translucent, but a pigmented and/or metallized aesthetic is desired, at least one pigmented and/or metallized layer may be provided within a laminate comprising the polymeric film—e.g., between the polymeric film and an optional adhesive layer or between the polymeric film and the solidified interlayer. Alternatively, or in combination with at least one pigmented and/or metallized layer sandwiched between the polymeric film and an outer layer on a first major side of a laminate comprising the polymeric film, a pigmented and/or metallized layer can be provided on the opposite side of the polymeric film in another embodiment. When the polymeric film is substantially opaque in such an embodiment, pigment and/or metallization is generally provided on an outer surface of the polymeric film, on a side that is outwardly visible when the polymeric film is adhered to a surface. In this embodiment, the polymeric film can be impregnated with a material (e.g., titanium dioxide) that causes the polymeric film to function as a reflective background, enhancing color of the overlying pigment. Pigment and/or metallization may also be provided on an outer surface of the polymeric film, alone or in combination with a pigmented and/or metallized layer within a laminate comprising the polymeric film, when the polymeric film is substantially transparent or substantially transparent.

Those of ordinary skill in the art are readily familiar with materials and methodology for formation of pigmented layers and metallized layers. Any suitable such material and methodology may be utilized in those embodiments of the present invention where the polymeric film is pigmented and/or metallized. While more than one pigmented and/or metallized layer can be used in laminates comprising polymeric films of the invention, the following description is made with reference to one such layer for simplicity only. Recognize that, if multiple pigmented and/or metallized layers are used, each pigmented and/or metallized layer within such a laminate can be the same or different.

When present, the metallized layer comprises any suitable material and provides desired aesthetics when the laminate comprising the polymeric film is adhered to a surface. The metallized layer can be a continuous or discontinuous layer. Note that the metallized layer may consist essentially of graphics, patterns, and the like, which results in that layer being a discontinuous layer and/or a non-planar layer.

In one embodiment, a metallized layer is formed by chemical or physical vapor deposition of a thin layer of aluminum or a desired metal or alloy thereof. The metallized layer comprises any suitable thickness. In an exemplary embodiment, the metallized layer has a maximum thickness of about 1,000 Angstroms, preferably less than about 500 Angstroms. In a further embodiment, the metallized layer has a minimum thickness of at least about 70 Angstroms.

When present, the pigmented layer comprises any suitable material and provides desired aesthetics when a laminate comprising the polymeric film is adhered to a surface. The pigmented layer can be a continuous or discontinuous layer. Note that the pigmented layer may consist essentially of graphics, patterns, and the like, which results in that layer being a discontinuous layer and/or a non-planar layer.

The pigmented layer generally comprises at least one material imparting desired color to the laminate comprising the polymeric film or portion thereof. In one embodiment, the pigmented layer comprises dye. In another embodiment, the pigmented layer comprises ink. Any suitable commercially available ink can be used. Non-limiting examples of suitable inks include pigmented acrylic ink (including pigmented, fast-dry, acrylic ink), pigmented urethane ink, epoxy ink, and a urethane enamel coating such as that sold by PRC-Desoto International, Inc. (a division of PPG Aerospace) of Glendale, Calif. under the trade designation, DESOTHANE HS.

Any suitable additives can optionally be used in the pigmented layer. For example, stabilizers (e.g., antioxidants, heat stabilizers, and UV-stabilizers), crosslinkers (e.g., aluminum or melamine crosslinkers), corrosion inhibitors, plasticizers, photocrosslinkers, additional colorants, fillers, and other conventional additives as known to those of ordinary skill in the art can be incorporated into the pigmented layer. If desired, an adhesion promoter may be included in the pigmented layer. However, in preferred embodiments, the material comprising the pigmented layer is selected to be chemically compatible with any adjacent layers of laminates comprising the polymeric film. Thus, an adhesion promoter is not required according to preferred embodiments of the invention.

Preferably, the pigmented layer is essentially free of components that may tend to migrate to the outer surface of the polymeric film, a laminate comprising the polymeric film, or to an interface therein, where such components may promote interlayer delamination or otherwise detrimentally affect the adherence of the polymeric film to adjacent surfaces or layers. The pigmented layer is also preferably resistant to chemicals to which it may be exposed during use of the polymeric film.

The pigmented layer comprises any suitable thickness. In an exemplary embodiment, the pigmented layer has a maximum thickness of about 50 microns, more preferably less than about 25 microns, and preferably about 5 microns to about 8 microns.

Preferably, the polymeric film is essentially free of components that may tend to migrate to the outer surface of the polymeric film or to an interface within laminates comprising the polymeric film, where such components may promote interlayer delamination or otherwise detrimentally affect adherence of the polymeric film to adjacent surfaces or layers. The polymeric film is also preferably resistant to chemicals to which it may be exposed during use of the polymeric film. For example, it is preferred that the polymeric film is resistant to degradation by water and hydraulic fluids. It is also preferred that the polymer layer is thermally resistant to temperatures to which it may be exposed during use of the polymeric film.

The polymeric film comprises any suitable thickness. In one embodiment, the polymer layer has a thickness of about 10 microns to about 400 microns. In another embodiment, the polymeric film has a thickness of about 10 microns to about 200 microns. In yet another embodiment, the polymeric film has a thickness of about 10 microns to about 50 microns. In an exemplary embodiment, the polymeric film is about 25 microns thick or less. It has been found that use of a relatively thin polymer layer contributes to superior stretchability of the polymeric film. Such stretchability allows polymeric films of the invention to be effectively used in covering articles having curved or other non-planar surfaces.

When present in laminates comprising the polymeric film, the adhesive layer comprises any suitable material. According to one embodiment, the adhesive layer generally comprises a base polymer with one or more additives. While any suitable chemistry can be used for the base polymer in the adhesive layer, (meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polybutadiene and copolymers thereof, polyisoprene and copolymers thereof, and silicones (e.g., polydimethylsiloxane and polymethylphenylsiloxane). In a preferred embodiment, the adhesive layer comprises a pressure-sensitive adhesive (PSA).

Any suitable additives can optionally be used in conjunction with the base polymer in the adhesive layer. For example, stabilizers (e.g., antioxidants, heat stabilizers, and UV-stabilizers), crosslinkers (e.g., aluminum or melamine crosslinkers), corrosion inhibitors, tackifiers, plasticizers, photocrosslinkers, fillers, and other conventional adhesive additives as known to those of ordinary skill in the art can be incorporated into the adhesive layer. If desired, an adhesion promoter may be included in the adhesive layer. However, in preferred embodiments, the material comprising the adhesive layer is selected to be chemically compatible with the polymeric film. Thus, an adhesion promoter is not required according to preferred embodiments of the invention.

Similar to the polymeric film, the adhesive layer may be pigmented and/or metallized and substantially transparent, substantially translucent, or substantially opaque, depending on the application and depending on such properties of the polymeric film and any pigmented and/or metallized layer within laminates comprising the polymeric film. In one embodiment, when the polymeric film is substantially transparent or substantially translucent, pigment and/or metallization is provided on the adhesive layer at its interface with the polymeric film. In this embodiment, the adhesive layer can be impregnated with a material (e.g., titanium dioxide) that causes the adhesive layer to function as a reflective background, bringing out the color of the overlying pigment.

Preferably, the adhesive layer is essentially free of components that may tend to migrate to the outer surface of the polymeric film or to an interface within a laminate comprising the polymeric film, where such components may promote interlayer delamination or otherwise detrimentally affect adherence of the polymeric film to adjacent surfaces or layers. The adhesive layer is also preferably resistant to chemicals to which it may be exposed during use of the polymeric film. For example, it is preferred that the adhesive layer is resistant to degradation by water and hydraulic fluids.

The adhesive layer comprises any suitable thickness. In one embodiment, the adhesive layer has a thickness of about 5 microns to about 150 microns. In a further embodiment, the adhesive layer has a thickness of about 30 microns to about 100 microns. In an exemplary embodiment, the adhesive layer is about 25 microns thick or less. However, the thickness of the adhesive layer can vary substantially without departing from the spirit and scope of the invention.

In an exemplary embodiment, a laminate comprising the polymeric film is a multi-layer extensible protective sheet as described in U.S. Patent Publication No. US-2008-0286576-A1, entitled "Protective Sheets, Articles, and Methods," incorporated herein by reference in its entirety. Another such exemplary laminate is described in U.S. Patent Publication No. US-2010-0059167-A1, entitled "Paint Replacement Films, Composites Therefrom, and Related Methods," incorporated herein by reference in its entirety.

Until the polymeric film is adhered to a surface, it can be stored with an optional release liner adjacent the adhesive layer, when present. The selection and use of such liners is within the knowledge of one of ordinary skill in the art. Advantageously, when employing improved application methods according to the invention, the release liner to which the adhesive layer is adhered need not be textured to impart air egress channels in the adhesive layer. In a preferred embodiment, while some randomly oriented texture may be present on the surface of the adhesive layer to be applied to an article, the adhesive layer is essentially free of ordered texture—e.g. air egress channels (such as those present in structured release liners marketed by Loparex LLC of Cary, N.C., under the trade designation, POLY SLIK air release liners)—when a laminate comprising the polymeric film is adhered to a surface. As such, any release liner adhered to the adhesive layer prior to application of the laminate is essentially smooth according to such preferred embodiments.

Preferably, essentially smooth release liners have a profile roughness parameter (Ra) value of less than about 50 nanometers as measured according to, for example, DIN 4768. More preferably, essentially smooth release liners have a profile roughness parameter (Ra) value of less than about 30 nanometers as measured according to, for example, DIN 4768. Even more preferably, essentially smooth release liners have a profile roughness parameter (Ra) value of less than about 10 nanometers as measured according to, for example, DIN 4768.

Those of ordinary skill in the art are readily familiar with the wide variety of suitable smooth release liners, many of which are readily marketed as "optically clear" release liners. Exemplary release liners that are essentially smooth include those marketed by the NORTON films group of Saint-Gobain Performance Plastics Corp. (Aurora, Ohio) under the trade designations, OPTILINER and SUPRALINER.

Polymeric films can be applied to a variety of articles to form assemblies according to methodology of the present invention. When applied to an article, the polymeric film and at least one exterior surface of the article are contacted with a polymerizable composition therebetween to form an assembly.

Interlayer

By use of the term "interlayer," it is to be understood that such a layer is positioned between the polymeric film or laminate comprising the polymeric film and the underlying surface in resulting articles after application of the polymeric film according to methodology of the invention. Before application of the polymeric film or laminate comprising the polymeric film to the underlying surface, however, interlayer is also used to denote that layer of material in the absence of surrounding structure. In that absence, the interlayer is outwardly exposed, not being sandwiched between the polymeric film and the underlying surface of the article onto which the polymeric film assembly is to be contacted. Any suitable material can be used for interlayers according to the invention.

Understand that, before application to the underlying surface, a solidified interlayer may be fully polymerized, partially polymerized, or essentially non-polymerized. Preferably, after application of heat to the same, the resulting softened interlayer has a relatively low viscosity so that it can flow over and into voids and defects that are commonplace within fiber-based surfaces, which flow translates into a smoother surface on the resulting article and such a surface with fewer visible defects. As measured, the softened interlayer may exhibit the desired viscosity at room temperature or upon heating. Viscosity measurements indicated herein are of the interlayer in its neat form (i.e., 100% non-volatile), without the presence of viscosity-reducing solvents. Viscosity is measurable according to techniques well known to those of ordinary skill in the art and may be measured using, for example, a Brookfield rotational viscometer such as those available from Cole-Parmer (Vernon Hills, Ill.).

According to the invention, the interlayer exhibits a desired viscosity only after heating to the softened interlayer. According to an exemplary aspect of this embodiment, Brookfield viscosity of the interlayer is less than about 10,000 centiPoise after heating to form the softened interlayer. In another embodiment, Brookfield viscosity of the interlayer is less than about 5,000 centiPoise after heating to form the softened interlayer. In yet another embodiment, Brookfield viscosity of the interlayer is less than about 2,000 centiPoise after heating to form the softened interlayer. In still a further embodiment, Brookfield viscosity of the interlayer is less than about 1,500 centiPoise after heating to form the softened interlayer. In an exemplary embodiment, Brookfield viscosity of the interlayer is about 50 centiPoise to about 1,500 centiPoise after heating to form the softened interlayer. In another exemplary embodiment, Brookfield viscosity of the interlayer is about 400 centiPoise to about 1,500 centiPoise after heating to form the softened interlayer.

Any suitable composition and method for solidifying the same can be used for the interlayer according to methodology of the invention. The interlayer can comprise thermoplastic or thermoset polymers. As a thermoplastic resin, the following are exemplary resins: polyamide resin, saturated polyester resin, polycarbonate resin, ABS resin, polyvinyl chloride resin, polyacetal resin, polystyrene resin, polyethylene resin, polyvinyl acetate resin, AS resin, methacrylate resin, polypropylene resin, and fluorine resin. Although chemistry can vary, epoxy, (meth)acrylate, and urethane-based compositions are particularly well-suited and preferred for many applications.

In one embodiment, the softened interlayer is polymerizable using free radical or similar polymerization methods. According to this embodiment, the softened interlayer and previously solidified interlayer from which it results include at least one monomer (e.g., vinyl or (meth)acrylate). The at least one monomer can react with itself and, in some further embodiments, other monomers present. Depending on the type of radiation used, at least one initiator may also be included with the at least one monomer in the softened interlayer and previously solidified interlayer from which it results.

In yet another embodiment, the softened interlayer is polymerizable using cationic or similar polymerizable methods. According to this embodiment, the softened interlayer and previously solidified interlayer from which it results include at least one monomer and at least one cationic initiator.

Polymerizable systems relying on ultraviolet, e-beam, or thermal polymerization can be used. Such systems include, for example, one-part and two-part epoxy resins. Thermosetting resins and thermoplastic resins can be used singly or in combination as an initial epoxy resin. The most common epoxy resin types include those based on diglycidyl ether of Bisphenol A and the epoxy novolacs (comprised of glycidyl ethers of cresol novolac, phenolic novolac, or Bisphenol A novolac). In one embodiment, the present invention provides for use of lower viscosity epoxy resins, such as those based on the diglycidyl ether of Bisphenol F. As compared to a typical epoxy resin based on diglycidyl ether of Bisphenol A (i.e., EPON 826 available from Resolution Performance Products of Houston, Tex.), exemplary lower viscosity epoxy resins of the present invention (i.e., EPON 862 and EPON 863 also available from Resolution Performance Products), which are based on diglycidyl ether of Bisphenol F, are reported to have a viscosity of 2.5-4.5 Pa·s (25-45 Poise) as compared to 6.5-9.6 Pa·s (65-96 Poise) when tested at 25° C. Another example of a Bisphenol F-derived epoxy resin is EPALLOY 8230, available from CVC Specialty Chemicals, Inc. of Moorestown, N.J. The reported viscosity of EPALLOY 8230 epoxy resin is 2.5-4.7 Pa·s (2,500-4,700 centiPoise).

Generally, when a thermosetting resin is used, a curative is needed to effectuate final cure of the resin, and any suitable curative can be used in that regard. As known to those skilled in the art, different curatives impart various advantages when used. For example, in epoxy systems, aliphatic amine curatives allow for room-temperature cure, whereas aromatic amines offer optimal chemical resistance and more rigid final parts. As another example, acid anhydride curatives can provide superior electrical properties. It is to be understood, however, that selection of the curative depends, among other well-known factors, on curing conditions desired and the intended application. In an exemplary embodiment, at least one curative is used that facilitates cure of the resin composition within about 45 to about 60 minutes when heated to about 120° C. (250° F.).

An exemplary class of curatives useful for curing of epoxy resins is the modified aliphatic amine curatives such as those available from Air Products and Chemicals, Inc. of Allentown, Pa under the ANCAMINE trade designation. In that class, ANCAMINE 2441 curing agent is particularly useful in exemplary resins according to the invention.

Another class of curatives includes dicyandiamides, optionally with the use of common accelerators. For example, a useful combination is OMICURE DDA 5, an ultra-micronized grade of dicyandiamide, and OMICURE U-52, an aromatic substituted urea used as an accelerator for dicyandiamide cure of epoxies (both available from CVC Specialty Chemicals, Inc. of Moorestown, N.J.). Another useful combination is AMICURE CG-1400, a micronized grade of dicyandiamide, and AMICURE UR, a substituted urea-based accelerator (1 phenyl 3,3 dimethyl urea) for dicyandiamide-cured epoxy resins (both available from Air Products and Chemicals, Inc. of Allentown, Pa.).

Any suitable amount of the curative is used in resin compositions of the invention. Generally, after the specific type of curative is selected, the amount used is calculated as is well known to those skilled in the art.

In another embodiment of a one-part system, after the polymeric film is contacted with the underlying fiber-based surface, thermal radiation is used to initiate polymerization of the softened interlayer. Thermal radiation is supplied by heating the underlying fiber-based surface according to one aspect of the invention. Thermal radiation is supplied by heating both the polymeric film assembly and underlying fiber-based surface according to another aspect of the invention. A latent curing agent is activated or a blocked reactive component (e.g., a blocked isocyanate) is unblocked upon initiation using thermal radiation according to exemplary aspects of this embodiment.

The type and amount of interlayer is selected according to the application and desired properties in the resulting article. In laminate form, where an adhesive layer is present on the surface of a laminate comprising the polymeric film to be contacted with the underlying surface, the amount of interlayer applied thereto can be minimized to a level that is sufficient to accommodate defects and fill in voids that are present on the underlying surface. In the case of class A type surfaces (e.g., as used in the automotive industry), where a primary concern is to eliminate entrapped air bubbles, only a small amount of interlayer is required. In certain embodiments, 1-5 grams per square meter (gsm) of interlayer is sufficient.

In alternate embodiments, where there is no existing adhesive layer, it is often preferable to maintain a minimum thickness of interlayer—and resulting solidified interlayer—between the polymeric film or laminate comprising the same and the underlying substrate. According to one aspect of that embodiment, the interlayer is selected such that the resulting solidified interlayer is about 5 to about 100 microns, preferably about 25 to about 50 microns, thick. If desired, optional filler material can be used to assist in maintaining that minimum thickness. An exemplary filler is 25-50 micron polymethylmethacrylate (PMMA) spheres manufactured by Sekisui Plastics Co., Ltd. under the trade name TECH POLYMER.

The length of time needed to adequately solidify the softened interlayer can vary. Preferably, the interlayer returns to a solidified interlayer (i.e., such that it is has a high enough viscosity to facilitate adequate adherence to the underlying surface—even though the overall composition may not be fully polymerized, if desired) in no more than about ten minutes, more preferably in no more than about five minutes, and even more preferably in no more than about one minute after contact of the softened interlayer with the underlying surface. Depending on the application and stage of processing, the interlayer can exhibit properties associated with a viscoelastic fluid, a viscoelastic solid, or an elastic solid. In an exemplary embodiment, the solidified interlayer exhibits a room temperature Brookfield viscosity of greater than about 20,000 centiPoise.

According to another aspect of an exemplary embodiment, when tested as a standalone film according to the Loss Factor Test Method described below, a solidified interlayer exhibits a peak loss factor of less than about 1.0. It is to be understood that loss factor is often used interchangeably with the phrase "tan delta" and is understood to be essentially the same as "loss factor" described herein.

According to the Loss Factor Test Method, a dynamic mechanical analyzer available from TA Instruments (New Castle, Del.) under the trade designation, TA Instruments DMA Q800 is used to perform the test in tension mode. Nominal sample sizes having a length of 5-12 mm, a width of 4-8 mm, and a thickness of 0.02-0.2 mm can be used. A frequency of 1 Hz, strain of 0.3%, and ramp rate of 3° C./minute can be used to measure values for determination of the loss factor of a sample. Such a loss factor corresponds to the storage modulus of the composition being greater than its loss modulus. Storage modulus can also be tested using the dynamic mechanical analyzer described in conjunction with the Loss Factor Test Method above.

Various modifications and alterations of the invention will become apparent to those skilled in the art without departing from the spirit and scope of the invention, which is defined by the accompanying claims. It should be noted that steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language. Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention. In addition, as discussed herein it is again noted that the polymerizable composition described herein may comprise all components in one or multiple parts. Other variations are recognizable to those of ordinary skill in the art.

The invention claimed is:

1. A method for applying a polymeric film to at least a portion of a surface of an article, the method comprising steps of:
   providing the polymeric film or a laminate comprising the polymeric film;
   applying a first solidified interlayer to a surface of the polymeric film or a surface of the laminate comprising the polymeric film to form a polymeric film assembly to be contacted with the portion of the surface of the article;
   heating at least a portion of the surface of the article to form a heated surface;
   applying the polymeric film assembly to at least a portion of the heated surface of the article by contacting the first solidified interlayer to the portion of the heated surface of the article such that at least a portion of the first solidified interlayer becomes a softened interlayer positioned between the polymeric film and the portion of the heated surface of the article; and
   converting the softened interlayer to a second solidified interlayer, which second solidified interlayer may be in a different form than or same form as the first solidified interlayer initially provided, for adherence of the polymeric film to at least the portion of the surface of the article,
   wherein the step of converting the softened interlayer to a second solidified interlayer comprises at least partial polymerization of the softened interlayer.

2. The method of claim 1, wherein the polymeric film is polyurethane-based.

3. The method of claim 1, wherein the portion of the surface of the article is fiber-based.

4. The method of claim 1, wherein Brookfield viscosity of the softened interlayer is measured using a Brookfield rotational viscometer to be less than about 10,000 centiPoise.

5. The method of claim 1, wherein Brookfield viscosity of the softened interlayer is measured using a Brookfield rotational viscometer to be less than about 5,000 centiPoise.

6. The method of claim 1, wherein Brookfield viscosity of the softened interlayer is measured using a Brookfield rotational viscometer to be less than about 2,000 centiPoise.

7. The method of claim 1, wherein Brookfield viscosity of the softened interlayer is measured using a Brookfield rotational viscometer to be less than about 1,500 centiPoise.

8. The method of claim 1, wherein Brookfield viscosity of the softened interlayer is measured using a Brookfield rotational viscometer to be less than about 50 centiPoise to about 1,500 centiPoise.

9. The method of claim 1, wherein room temperature Brookfield viscosity of the first solidified interlayer is measured using a Brookfield rotational viscometer to be greater than about 20,000 Poise.

10. The method of claim 1, wherein room temperature Brookfield viscosity of the second solidified interlayer is measured using a Brookfield rotational viscometer to be greater than about 20,000 Poise.

11. The method of claim 1, wherein the polymeric film or laminate comprising the polymeric film is at least partially pigmented and/or at least partially metallized.

12. The method of claim 1, further comprising a step of separating the polymeric film, and any laminate of which it is a part, from the portion of the surface of the underlying article, leaving behind a substantial portion of the second solidified interlayer on the underlying article.

13. The method of claim 12, further comprising applying a second polymeric film or second laminate comprising the second polymeric film to at least the portion of the surface of the underlying article.

14. The method of claim 1, wherein the article comprises a motorized vehicle.

15. The method of claim 1, wherein there is a lack of covalent crosslinking between the first solidified interlayer and the polymeric film or the laminate comprising the polymeric film of the polymeric film assembly.

16. The method of claim 1, wherein the first solidified interlayer exhibits a peak loss factor of less than about 1.0.

17. The method of claim 1, wherein the second solidified interlayer exhibits a peak loss factor of less than about 1.0.

18. The method of claim 1, wherein only a portion of the solidified interlayer becomes softened, and wherein the portion of the solidified interlayer in contact with the heated surface becomes softened.

* * * * *